(12) United States Patent
Niedermier et al.

(10) Patent No.: US 8,037,913 B2
(45) Date of Patent: Oct. 18, 2011

(54) PNEUMATIC TIRE WITH SINGLE NON-CONTINUOUS CARCASS PLY

(75) Inventors: James Kenneth Niedermier, Cuyahoga Falls, OH (US); Michael Thomas Driscoll, Norton, OH (US); Timothy Michael Rooney, Munroe Falls, OH (US); Robert Anthony Neubauer, Medina, OH (US); Robert Allen Losey, Kent, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 519 days.

(21) Appl. No.: 12/193,818

(22) Filed: Aug. 19, 2008

(65) Prior Publication Data

US 2010/0043936 A1    Feb. 25, 2010

(51) Int. Cl.
B60C 9/00 (2006.01)
B60C 9/02 (2006.01)
B60C 15/00 (2006.01)
(52) U.S. Cl. ........ 152/548; 152/539; 152/552; 152/554; 152/555
(58) Field of Classification Search .................. None
See application file for complete search history.

(56) References Cited

U.S. PATENT DOCUMENTS

| | | | |
|---|---|---|---|
| 3,481,386 A | 12/1969 | Menell et al. | 152/354 |
| 3,509,930 A | 5/1970 | Mirtain | 152/354 |
| 4,185,675 A | 1/1980 | Greiner et al. | 152/354 R |
| 4,832,103 A | 5/1989 | Slivka et al. | 152/559 |
| 5,379,819 A * | 1/1995 | Adachi | 152/542 |

(Continued)

FOREIGN PATENT DOCUMENTS

EP    0479065    4/1992

(Continued)

OTHER PUBLICATIONS

European Search Report completed Nov. 25, 2009.

(Continued)

*Primary Examiner* — Justin Fischer
(74) *Attorney, Agent, or Firm* — Robert N. Lipcsik

(57) ABSTRACT

A carcass for a pneumatic tire includes a first annular bead, a second annular bead, a first continuous radial ply, a second continuous radial ply, and a third non-continuous radial ply. The first radial ply has two shoulder portions and two lateral edge portions. One lateral edge portion of the first ply extends from one shoulder portion of the first ply radially inward to a location proximal to the first annular bead. The other lateral edge portion of the first ply extends from the other shoulder portion of the first ply radially inward to a location proximal to the second annular bead. The second continuous radial ply has two shoulder portions and two lateral edge portions. One lateral edge portion of the second ply extends from one shoulder portion of the second ply radially inward to a location proximal to the first annular bead. The other lateral edge portion of the second ply extends from the other shoulder portion of the second ply radially inward to a location proximal to the second annular bead. The third non-continuous radial ply has a first portion and a second portion separate and distinct from the first portion. The first portion of the third ply extends from a location proximal to one shoulder portion of the second ply to a location proximal to the first annular bead. The second portion extends from the other shoulder portion of the second ply to a location proximal to the second annular bead.

5 Claims, 2 Drawing Sheets

U.S. PATENT DOCUMENTS

| | | | |
|---|---|---|---|
| 6,016,857 | A | 1/2000 | Roesgen et al. |
| 6,016,858 | A | 1/2000 | Roesgen et al. |
| 6,263,935 | B1 | 7/2001 | Oare et al. |
| 6,374,891 | B1 | 4/2002 | Allmond et al. |
| 6,527,025 | B1 * | 3/2003 | Minami ................. 152/555 |
| 6,536,495 | B1 | 3/2003 | Close et al. |
| 6,634,399 | B1 | 10/2003 | Sykora et al. |
| 6,688,357 | B1 | 2/2004 | Gerresheim et al. |
| 6,712,108 | B1 | 3/2004 | Koeune et al. |
| 6,913,053 | B2 | 7/2005 | Reep et al. |
| 6,986,373 | B2 | 1/2006 | Gerresheim et al. |
| 7,017,635 | B2 | 3/2006 | Losey |
| 7,104,301 | B2 | 9/2006 | Koeune et al. |
| 7,152,647 | B2 | 12/2006 | Maruoka et al. |
| 2002/0003017 | A1 | 1/2002 | Baumann et al. |
| 2004/0016497 | A1 | 1/2004 | Morgan et al. |
| 2004/0140035 | A1 | 7/2004 | Gerresheim et al. |
| 2004/0144470 | A1 | 7/2004 | Oare et al. |
| 2004/0226644 | A1 | 11/2004 | Koeune et al. |
| 2005/0051251 | A1 | 3/2005 | Sinopoli et al. |
| 2007/0006958 | A1 | 1/2007 | Wright |
| 2007/0131333 | A1 | 6/2007 | Neubauer et al. |

FOREIGN PATENT DOCUMENTS

| | | | |
|---|---|---|---|
| EP | 0650855 | A1 | 5/1995 |
| EP | 0700797 | | 3/1996 |
| EP | 1010552 | * | 6/2000 |
| EP | 1057659 | | 12/2000 |
| EP | 1808313 | | 7/2007 |
| JP | 11-227425 | * | 8/1999 |
| JP | 2000-25411 | * | 1/2000 |
| JP | 2008-62716 | * | 3/2008 |
| JP | 2007-153276 | * | 6/2011 |
| RU | 2209139 | C2 | 7/2003 |

OTHER PUBLICATIONS

U.S. Appl. No. 11/872,136, filed Oct. 15, 2007, Neubauer, et al.

* cited by examiner

PNEUMATIC TIRE WITH SINGLE NON-CONTINUOUS CARCASS PLY

FIELD OF INVENTION

The present invention relates to a pneumatic tire, and more particularly, to a carcass ply arrangement for a pneumatic tire.

BACKGROUND OF THE INVENTION

A conventional pneumatic tire may utilize an outside-in radial ply construction, which aids to torque the tire bead onto the rim of a wheel to which the tire is mounted and allows the rim to provide greater support for the tire. The size of the bead may be reduced, permitting a reduction in the amount of rubber and reinforcement around and above the bead.

A conventional two-ply radial runflat tire may have a belt structure, a ply structure, two inextensible beads, and two wedge-insert reinforced sidewalls. The outer ply may be reinforced by a high-modulus, light-weight aramid. The aramid reinforcement material of the outer ply may be clamped around the beads. The outer ply may be prestressed in tension during manufacture of the tire. The resultant tire may be light in weight and may resist upward buckling of the tread during runflat operation.

Another conventional pneumatic tire may comprise a carcass ply extending between bead portions and a top rubber layer. The top rubber layer may face the inside of the tire and be made of a butyl rubber compound containing at least ten parts by weight of butyl rubber or butyl rubber derivative. This tire may further include a belt disposed radially outside the carcass under the tread portion. The belt may comprise at least one ply of monofilament cords laid at an angle from 10 to 40 degrees with respect to the circumferential direction of the tire with each of the monofilament cords consisting of a single filament. The belt further may comprise one ply of multifilament cords or one ply of monofilament cords. The height of a bead apex, which is disposed between a carcass ply turnup portion and a main portion of the carcass ply at each bead portion, may be reduced to a range from 10 to 20 mm. Thus, the carcass ply turnup portion may extend radially outward beyond the radially outer end of the bead apex so as to adjoin the main portion of the carcass ply.

A conventional radial ply runflat pneumatic tire may have a carcass with a bead portion, a carcass reinforcing structure, and a bead filler. The carcass reinforcing structure may have at least two ply structures with cords extending to each bead. The carcass may include elastomeric first and second fillers. The first filler may be located between the first ply structure and an innerliner of the tire. The second filler may be located between the first and second ply structures. The first and second fillers may stiffen sidewalls of the carcass to permit operation of the tire while uninflated. The tire may further include an aramid overlay radially outward of a belt structure.

Another conventional radial ply pneumatic tire may have a carcass with a first continuous radial ply with shoulder portions and lateral edge portions, a second non-continuous radial ply, and a third non-continuous radial ply. A crown portion of the carcass may have a first edge and a second edge. The second non-continuous radial ply may have a right side extending from approximately the first edge of the carcass crown portion to approximately around a first bead core and a left side extending from approximately the second edge of the carcass crown portion to approximately around a second bead core. The third non-continuous radial ply may have a right side extending from approximately the first edge of the carcass crown portion to approximately around the first bead core and a left side extending from approximately the second edge of the carcass crown portion to approximately around the second bead core. The third radial ply overlays the second radial ply.

SUMMARY OF THE INVENTION

A carcass for a pneumatic tire in accordance with the present invention includes a first annular bead, a second annular bead, a first continuous radial ply, a second continuous radial ply, and a third non-continuous radial ply. The first radial ply has two shoulder portions and two lateral edge portions. One lateral edge portion of the first ply extends from one shoulder portion of the first ply radially inward to a location proximal to the first annular bead. The other lateral edge portion of the first ply extends from the other shoulder portion of the first ply radially inward to a location proximal to the second annular bead. The second continuous radial ply has two shoulder portions and two lateral edge portions. One lateral edge portion of the second ply extends from one shoulder portion of the second ply radially inward to a location proximal to the first annular bead. The other lateral edge portion of the second ply extends from the other shoulder portion of the second ply radially inward to a location proximal to the second annular bead. The third non-continuous radial ply has a first portion and a second portion separate and distinct from the first portion. The first portion of the third ply extends from a location proximal to one shoulder portion of the second ply to a location proximal to the first annular bead. The second portion extends from the other shoulder portion of the second ply to a location proximal to the second annular bead.

In another aspect of the present invention, the first portion of the third ply extends around the first annular bead and the second portion of the third ply extends around the second annular bead.

In still another aspect of the present invention, one lateral edge portion of the first ply extends around the first annular bead and the other lateral edge portion of the first ply extends around the second annular bead.

In yet another aspect of the present invention, one lateral edge portion of the second ply extends around the first annular bead and the other lateral edge portion of the second ply extends around the second annular bead.

In still another aspect of the present invention, the first ply comprises cords oriented at a five degree angle relative to radii of the pneumatic tire. Additionally, the second ply may comprise cords oriented at a minus five degree angle relative to radii of the pneumatic tire. Furthermore, the first and second portions of the third ply may both comprise cords oriented at a five degree angle relative to radii of the pneumatic tire.

In yet another aspect of the present invention, the first ply comprises cords oriented at a fifteen degree angle relative to radii of the pneumatic tire. Additionally, the second ply may comprise cords oriented at a minus fifteen degree angle relative to radii of the pneumatic tire. Furthermore, the first and second portions of the third ply may both comprise cords oriented at a fifteen degree angle relative to radii of the pneumatic tire.

In still another aspect of the present invention, the first ply is disposed radially inward of the second ply. Additionally, both the first ply and the second ply may be disposed radially inward of the third ply.

In yet another aspect of the present invention, the third ply is disposed radially inward of the first ply. Additionally, the second ply may be disposed radially inward of both the first ply and the third ply.

A pneumatic tire in accordance with the present invention comprises a first annular bead, a second annular bead, a first continuous radial ply, a second continuous radial ply, and a single third non-continuous radial ply. The first continuous radial ply has two shoulder portions and two lateral edge portions. One lateral edge portion of the first ply extends from one shoulder portion of the first ply radially inward to a location proximal to the first annular bead. The other lateral edge portion of the first ply extends from the other shoulder portion of the first ply radially inward to a location proximal to the second annular bead. The second continuous radial ply has two shoulder portions and two lateral edge portions. One lateral edge portion of the second ply extends from one shoulder portion of the second ply radially inward to a location proximal to the first annular bead. The other lateral edge portion of the second ply extends from the other shoulder portion of the second ply radially inward to a location proximal to the second annular bead. The third non-continuous radial ply has a first portion and a second portion separate and distinct from the first portion. The first portion extends from a location proximal to one shoulder portion of the second ply to a location proximal to the first annular bead. The second portion extends from the other shoulder portion of the second ply to a location proximal to the second annular bead.

In another aspect of the present invention, the pneumatic tire further comprises an overlay disposed radially outward of the first ply, the second ply, and the third ply.

BRIEF DESCRIPTION OF THE DRAWINGS

The invention may take physical form in certain parts and arrangements of parts, examples of which will be described in detail in this specification and illustrated in the accompanying drawings which form a part hereof and wherein.

DEFINITIONS

The following terms may be used throughout the descriptions presented herein and should generally be given the following meaning unless contradicted or modified by the description set forth herein.

"Axial" and "axially" mean the lines or directions that are parallel to the axis of rotation of the tire.

"Carcass" means the tire structure apart from the belt structure, tread, undertread, and sidewall rubber over the plies, but including bead cores.

"Carcass crown portion" means the portion of the carcass over which the crown of the tread is placed.

"Crown" or "tire crown" means the tread, tread shoulders, and the immediately adjacent portions of the sidewalls.

"Interior" means, generally, the inside surface of the tire.

"Exterior" means, generally, the outside surface of the tire.

"Pneumatic tire" means a laminated mechanical device of generally toroidal shape (usually an open-torus) having bead cores and a tread made of rubber, chemicals, fabric, and/or steel and other suitable materials. When mounted on a rim of a wheel of a motor vehicle, the pneumatic tire, through its tread, provides support, traction, and containment of fluid that sustains the vehicle load.

"Radial" and "radially" mean directions toward or away from, and + or −15° relative to, an axis of rotation of a tire.

"Sidewall" means that component which comprises a portion of the outside surface of a tire radially between the tread and the bead.

DETAILED DESCRIPTION OF EXAMPLE EMBODIMENTS OF THE INVENTION

Figure 1:
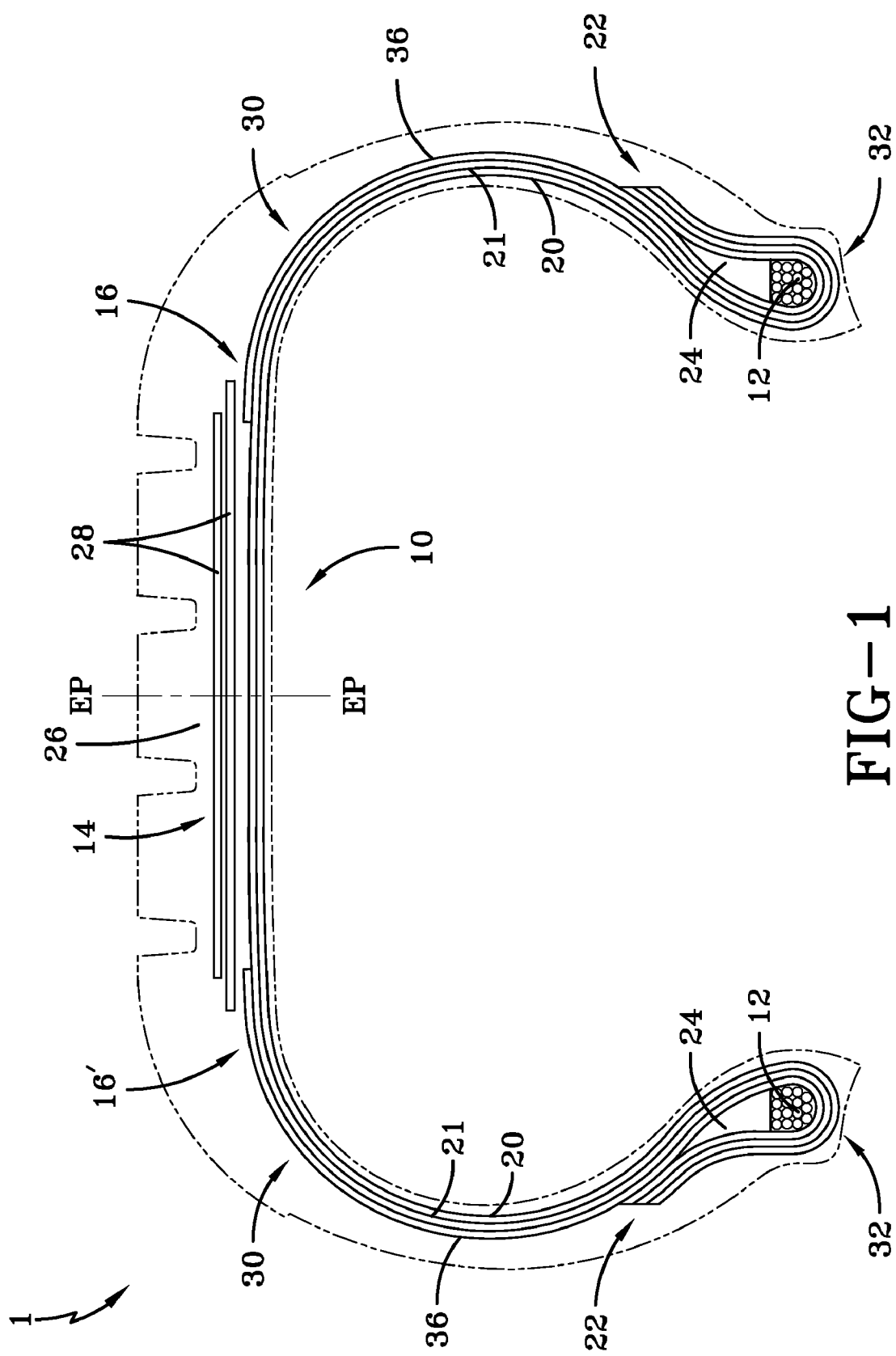
FIG. 1 is a cross-section of an example tire constructed in accordance with the present invention.

Referring now to the drawings, which are for purposes of illustrating example embodiments of the invention only and not for purposes of limiting the invention, FIG. 1 shows a pneumatic tire 1 with a carcass 10 having a carcass crown portion 14 (wherein the carcass crown portion as two side edge portions 16, 16'), a first radial ply 20, a second radial ply 21, turn-up ends 22, apexes 24, shoulders 30, and bead regions 32. The bead regions 32 have a pair of axially spaced beads 12 around which are wrapped the turn-up ends 22 of the first and second radial plies 20, 21. The apexes 24 are sandwiched between a main body of the radial plies 20, 21 and the turn-up ends 22 of the radial plies. The carcass 10 is radially surrounded by a tread 26. The pneumatic tire 1 further has a dual belt reinforcement structure 28 overlaying the carcass crown portion 14 and underlying the tread 26.

The first radial ply 20 is a continuous ply extending from shoulders 30 to and around the beads 12 and ends in the turn-up ends 22. The second radial ply 21 is a continuous ply extending from shoulders 30 to and around the beads 12 and ends in the turn-up ends 22. The carcass 10 further includes a third non-continuous radial ply 36 having a first portion and a second portion. The first portion begins at a first edge 16 of the crown carcass portion 14, overlaying a right side of the second radial ply 21, and extends radially downward to and around the right bead 12 (as shown in FIG. 1). The second portion of the third radially ply 36 begins at a second edge 16' of the crown carcass portion 14, overlaying a left side of the second radial ply 21, and extends radially downward to and around the left bead 12 (as shown in FIG. 1). The configuration in this example embodiment illustrates a three-ply construction for the sidewalls of the pneumatic tire 1 with fully turned up ends 22 of each of the radial plies 20, 21, 36.

Figure 2:
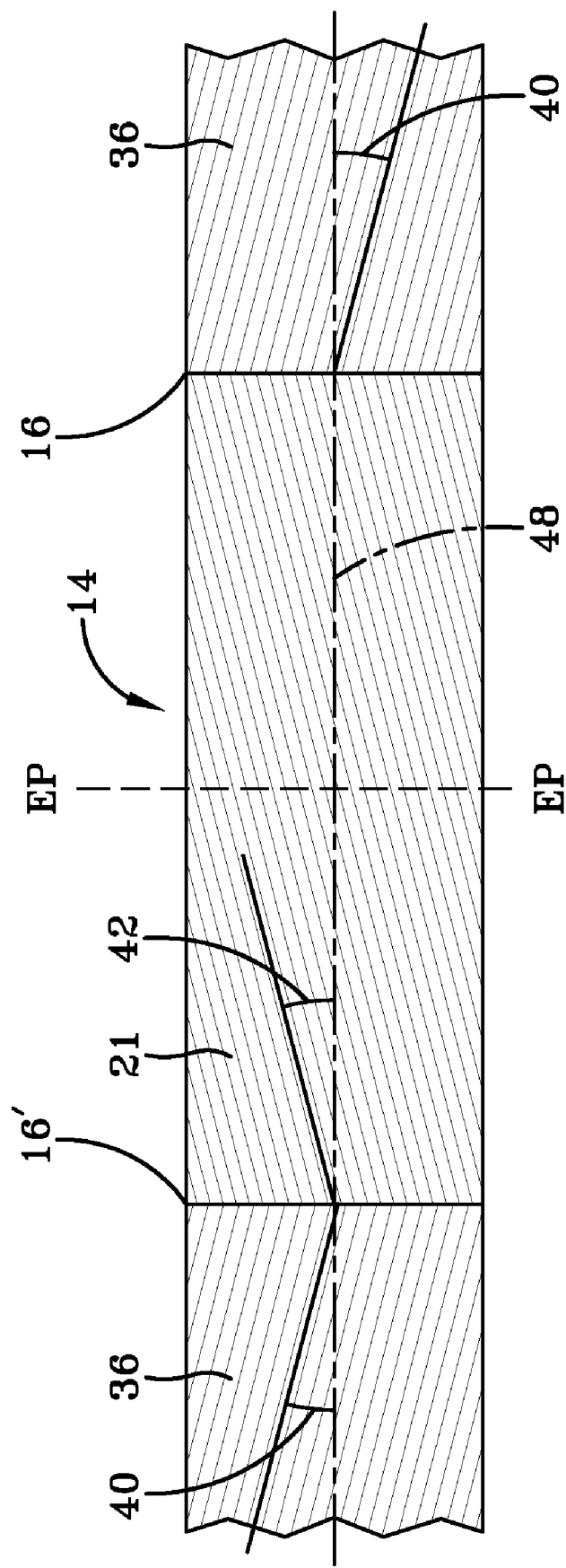
FIG. 2 is a top view of an example carcass for use with the example tire of FIG. 1.

FIG. 2 shows the second and third radial plies 21, 36 of the carcass 10 from the top and the angles of the reinforcing cords of the plies. A centerline 48 is shown in the FIGURES and the angle 40 of the cords of the third radial ply 36 are shown with respect to the centerline 48. In the example of FIG. 2, the angle 40 of the cords of the third radial ply 36 is shown as 15°, but may be + or −15° with respect to the centerline 48. The angle 42 of the cords of the second radial ply 21 is shown as −15°, but may be + or −15° with respect to the centerline 48. The angle of the cords of the first radial ply 20 (not shown) would typically be 15° is this example arrangement, but may be + or −15° with respect to the centerline 48.

With reference to FIGS. 1-2, the plies 20, 21, 36 may be made of either similar or dissimilar materials with the type of material not intended to be a limitation to this invention. It is to be understood that the plies 20, 21, 36 could be made of any suitable material. It is also to be understood that the plies 20, 21, 36 may be of any length, including not extending to, extending just up to, and/or extending to and around the turn-up ends 22 (FIG. 1) in any combination, as long as the third radial ply 36 is non-continuous and the edge portions 16, 16' do not connect to each other. It is further to be understood that the present invention is not limited to three plies, but any number of plies could be used.

Thus, a pneumatic tire in accordance with the present invention may have two or more continuous plies, but only one non-continuous ply. Further, the single non-continuous radial ply in accordance with the present invention may be the radially inwardmost, radially outwardmost (FIG. 1), or sandwiched in between the other radial plies.

It is further to be understood any of the plies of the carcass may not wrap around the bead core 12 and "float" or extend just to the bead core 12. The plies 20, 21, 36 may thus, in any combination, extend to the bead core 12, partially around the bead core, or all the way around the bead core 12 (FIG. 1). Also, the third non-continuous ply 36 may begin at approximately the side edge portions 16, 16' (FIG. 1) or, alternatively, extend substantially beyond the side edge portions 16, 16' as long as the third ply does not become a continuous ply.

A pneumatic tire having three plies in the side wall region, constructed in accordance with the present invention, when driven off road, has greater resistance to sidewall punctures, cuts, and tears versus a conventional two-ply tire. Further, when the third ply is turned up around the beads, greater strength is imparted into the carcass than a carcass with a "floating" third ply not turned up around the beads. When the third ply is non-continuous, or split, under the crown region as well, the crown region has greater flexibility thereby improving off-road traction and envelopement of obstacles while the two continuous plies still maintain sufficient puncture resistance in the crown region (i.e., greater puncture resistance than the convention two split-ply construction). Additionally, the reduction of material provided by a split third ply reduces cost and weight compared to a continuous third ply.

Various embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A carcass for a pneumatic tire comprising:
a first annular bead;
a second annular bead;
a first continuous radial ply with two shoulder portions and two lateral edge portions, one lateral edge portion extending from one shoulder portion radially inward to a location proximal to the first annular bead, the other lateral edge portion extending from the other shoulder portion radially inward to a location proximal to the second annular bead;
a second continuous radial ply with two shoulder portions and two lateral edge portions, one lateral edge portion extending from one shoulder portion radially inward to a location proximal to the first annular bead, the other lateral edge portion extending from the other shoulder portion radially inward to a location proximal to the second annular bead; and
a third non-continuous radial ply with a first portion and a second portion separate and distinct from the first portion, the first portion extending from a location proximal to one shoulder portion of the second ply to a location proximal to the first annular bead, the second portion extending from the other shoulder portion of the second ply to a location proximal to the second annular bead, the third ply extends around the first annular bead and the second portion of the third ply extends around the second annular bead,
the first ply comprising cords oriented at a fifteen degree angle relative to radii of the pneumatic tire, the second ply comprising cords oriented at a minus fifteen degree angle relative to radii of the pneumatic tire, and the first and second portions of the third ply both comprising cords oriented at a fifteen degree angle relative to radii of the pneumatic tire,
the third ply being disposed radially inward of the first ply, the second ply being disposed radially inward of both the first ply and the third ply.

2. The carcass of claim 1 wherein one lateral edge portion of the first ply extends around the first annular bead and the other lateral edge portion of the first ply extends around the second annular bead.

3. The carcass of claim 1 wherein one lateral edge portion of the second ply extends around the first annular bead and the other lateral edge portion of the second ply extends around the second annular bead.

4. A pneumatic tire comprising:
a first annular bead;
a second annular bead;
a first continuous radial ply with two shoulder portions and two lateral edge portions, one lateral edge portion extending from one shoulder portion radially inward to a location proximal to the first annular bead, the other lateral edge portion extending from the other shoulder portion radially inward to a location proximal to the second annular bead;
a second continuous radial ply with two shoulder portions and two lateral edge portions, one lateral edge portion extending from one shoulder portion radially inward to a location proximal to the first annular bead, the other lateral edge portion extending from the other shoulder portion radially inward to a location proximal to the second annular bead; and
a single third non-continuous radial ply with a first portion and a second portion separate and distinct from the first portion, the first portion extending from a location proximal to one shoulder portion of the second ply to a location proximal to the first annular bead, the second portion extending from the other shoulder portion of the second ply to a location proximal to the second annular bead, the third ply extends around the first annular bead and the second portion of the third ply extends around the second annular bead,
the first ply comprising cords oriented at a fifteen degree angle relative to radii of the pneumatic tire, the second ply comprising cords oriented at a minus fifteen degree angle relative to radii of the pneumatic tire, and the first and second portions of the third ply both comprising cords oriented at a fifteen degree angle relative to radii of the pneumatic tire,
the third ply being disposed radially inward of the first ply, the second ply being disposed radially inward of both the first ply and the third ply.

5. The pneumatic tire of claim 4 further comprising an overlay disposed radially outward of the first ply, the second ply, and the single third ply.

* * * * *